United States Patent
Burtt

(10) Patent No.: US 8,660,485 B2
(45) Date of Patent: Feb. 25, 2014

(54) NEAR FIELD COMMUNICATION DEVICE

(75) Inventor: Andrew Burtt, Redhill (GB)

(73) Assignee: NXP B.V., Eindhoven (NL)

( * ) Notice: Subject to any disclaimer, the term of this patent is extended or adjusted under 35 U.S.C. 154(b) by 165 days.

(21) Appl. No.: 13/358,419

(22) Filed: Jan. 25, 2012

(65) Prior Publication Data

US 2012/0208459 A1  Aug. 16, 2012

(30) Foreign Application Priority Data

Feb. 16, 2011 (EP) .................. 11154629

(51) Int. Cl.
*H04B 5/00*  (2006.01)
(52) U.S. Cl.
USPC .......................... 455/41.1; 330/277
(58) Field of Classification Search
USPC ............... 455/41.1, 41.2; 330/269, 277
See application file for complete search history.

(56) References Cited

U.S. PATENT DOCUMENTS 8,270,921 B2 * 9/2012 Dubash et al. ............. 455/192.2
8,437,696 B2 * 5/2013 Audic .......................... 455/41.1
2008/0180224 A1  7/2008 Klapf et al.
2010/0194475 A1 * 8/2010 Okayama et al. ............. 330/151
2013/0115876 A1 * 5/2013 McFarthing ................. 455/41.1

FOREIGN PATENT DOCUMENTS

| EP | 0 829 940 A2 | 3/1998 |
| JP | 2010 157096 A | 7/2010 |
| JP | 2010-157096 A | 7/2010 |
| WO | 2007/072361 A2 | 6/2007 |

OTHER PUBLICATIONS

Extended European Search Report for EP Patent Appln. No. 11154629.7 (Aug. 1, 2011).

* cited by examiner

*Primary Examiner* — Creighton Smith

(57) ABSTRACT

Near field communication (NFC) devices may be required to operate at low power and so process small signals which are more susceptible to corruption by noise. An NFC device 100 is described having an antenna 10 which can be adapted to receive signal from a further NFC device. When a signal is received by the antenna, an input voltage is generated. A variable resistance element 12 is connected in series between the antenna 10 and an amplifier 14, which is adapted to increase the input resistance with increasing input voltage. By increasing the resistance when the input voltage is increased, the current drawn from the coil is reduced. This results in a lower overall power consumption of the device while maintaining reliable performance, because the higher input signal level is less susceptible to corruption by the noise generated by the variable resistance element 12, and the amplifier 14.

15 Claims, 3 Drawing Sheets

NEAR FIELD COMMUNICATION DEVICE

CROSS-REFERENCE TO RELATED APPLICATIONS

This application claims the priority under 35 U.S.C. §119 of European patent application no. 11154629.7, filed on Feb. 16, 2011, the contents of which are incorporated by reference herein.

FIELD OF INVENTION

This invention relates to near field communication (NFC) devices. It further relates to keyless entry devices, transponders, RFID tags and hearing aids.

BACKGROUND

It is known that near field communication (NFC) devices can be used for wireless communication over short distances typically within a range of 1.5 meters. An example of an NFC system is described in WO 2007/072361 A2. A transmitter and a receiver with an antenna circuit are disclosed, the antenna circuit comprising a coil and either a monopole or dipole connected to the coil. The antenna circuit captures a signal with a wavelength transmitted by a transmitter. The coil captures the signal and generates a current having a frequency corresponding to the wavelength. The coil is dimensioned such that the current is distributed uniformly within the coil at each point in time.

An NFC device can be used as a component in many systems such as, without limitation, a keyless entry system. A portable NFC transponder device has an antenna including a coil or inductor which is placed near to a fixed transponder. The fixed NFC transponder controls the lock and is typically powered by a mains supply. The antennae in the two transponders transmit and receive information between the two devices. Furthermore the power transmitted from the fixed transponder to the portable transponder may also be used to provide all the power supply requirements for the portable device if the overall power consumption of the device can be kept small enough. Alternatively the portable transponder may have a small battery although this is typically less desirable. Because of the need to keep power consumption as low as possible, the voltages and currents are small; this can result in loss of information during transmission if the environment is noisy, which is undesirable as a keyless entry system needs to operate reliably. There is therefore a need to develop an improved NFC communication device that can operate reliably with lower power consumption.

SUMMARY OF INVENTION

Various aspects of the invention of the invention are defined in the accompanying claims. In a first aspect there is provided a near field communication device comprising an antenna configured to receive a signal transmitted by another near field communication device and to generate an input voltage from the signal, an amplifier, a variable resistance element arranged in series between the antenna and an input of the amplifier, and a controller coupled to the variable resistance element; wherein the near field communication device is operable: in response to an increase in the input voltage to increase the resistance of the variable resistance element, and in response to a decrease in the input voltage to decrease the resistance of the variable resistance element. A variable resistance element may be an element where the value of the resistance can be continuously varied or selected from a number of discrete values.

At small input voltages, for example less than 1 volt, the variable resistance may be at a relatively small value which is typically less than 5 kOhm. At low voltages the dominant sources of noise are the amplifier and thermal noise of the resistor. However, by having a relatively low value of resistance, the input noise can be reduced at the expense of increased power consumption. By increasing the resistance when the input voltage is increased the overall power consumption of the device is reduced while maintaining reliable performance, because the higher input signal level is less susceptible to corruption by the noise generated by the variable resistance element, the variable shunt resistor and the amplifier.

In an embodiment the near field communication device further comprises a variable shunt resistance coupled between the input of the amplifier and a ground; wherein the variable shunt resistance is configured to receive the input voltage from the antenna and to shunt current to the ground, and wherein the near field communication device is further operable: in response to an increase in the input voltage to decrease the resistance of the variable shunt resistance, and in response to a decrease in the input voltage to increase the resistance of the variable shunt resistance.

The shunt resistance and variable resistance element may thus act as a potential divider for the input voltage. As the input voltage increases the ratio of the resistance of the shunt resistance and variable resistance can be adjusted to stabilize the output voltage from the amplifier.

In a further embodiment, the near field communication device comprises a first resistor, a switch connected to the controller, and a second resistor arranged in series with the switch; wherein the switch and the second resistor are arranged in parallel with the first resistor, and the switch is operable to couple the second resistor between the first node and the second node dependent on the value of the input voltage and the control input.

In a further embodiment the switch comprises a field effect transistor and a controller is coupled to the gate of the field effect transistor.

In an embodiment the field effect transistor is an NMOS device, the controller is configured to generate a gate control voltage wherein the NMOS device is configured to couple the second resistor in parallel with the first resistor when the input voltage is less than or equal to the difference between the value of the gate control voltage and the threshold voltage of the NMOS device.

The arrangement of the NMOS transistor coupled to the input voltage, simplifies the control mechanism, so only a constant reference voltage is required at the control terminal or gate of the NMOS device.

In an embodiment, the controller comprises a digital logic gate, wherein the output of the digital logic gate is coupled to the control terminal of the variable resistance element.

In further embodiments, the variable shunt resistance comprises a shunt transistor having a control terminal coupled to the antenna. The transistor can be configured as a voltage controlled resistor to vary the resistance dependent on the input voltage. Preferably the transistor can be an NMOS field effect transistor.

In other embodiments the antenna comprises a coil.

Preferably the NFC device can form part of a keyless entry component. Because the resistance of the shunt resistor and variable resistance can be altered, the component may be able to be operated reliably from the power received from the NFC transmitter, so the device can be passive requiring no internal power source.

In other embodiments, the NFC device can form part of a transponder, RFID tag or hearing aid.

Embodiments of the invention are now described in detail, by way of example only, illustrated by the accompanying drawings in which.

Figure 1:
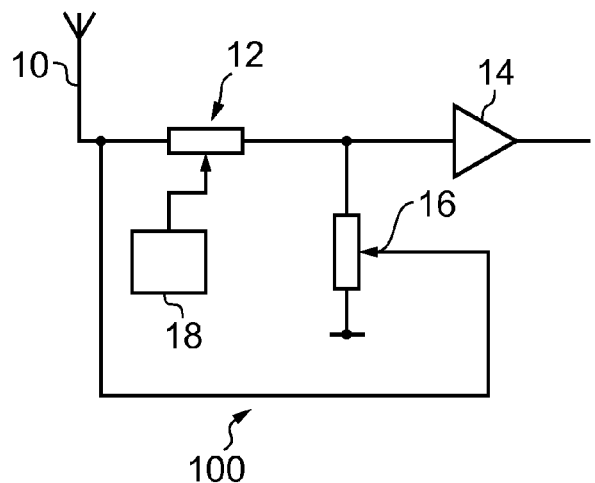
FIG. 1 shows an NFC device according to a first embodiment of the invention.

It should be noted that the Figures are diagrammatic and not drawn to scale. Relative dimensions and proportions of parts of these Figures have been shown exaggerated or reduced in size, for the sake of clarity and convenience in the drawings. The same reference signs are generally used to refer to corresponding or similar feature in modified and different embodiments

DESCRIPTION

FIG. 1 shows an embodiment of the NFC device 100. Antenna 10 is connected to first node of variable resistance element 12. The other end of variable resistance element 12 is connected to an input amplifier 14. Variable resistance element may be controlled by controller 18.

Variable shunt resistor 16 is connected between input of amplifier 14 and ground. The term ground can mean a node which when the device is in operation is connected to ground, virtual ground, or 0 volts. The control input of variable shunt resistor 16 is connected to the antenna 10.

In operation, a signal received by the antenna from a further NFC device can generate an input voltage on the first node of the variable resistance element 12. The resistance of the variable resistance element 12 can be varied between a first value of resistance when the input voltage is below a threshold value and a second higher value of resistance when the input voltage is higher than the threshold value. The resistance of the variable shunt resistor 16 can decrease as the input voltage increases.

In other embodiments antenna 10 may be connected via a further circuit which can be a rectifier, to variable resistance element 12. In some embodiments, the variable resistance element can be connected to the input of amplifier 14 via other circuit elements.

Figure 2:
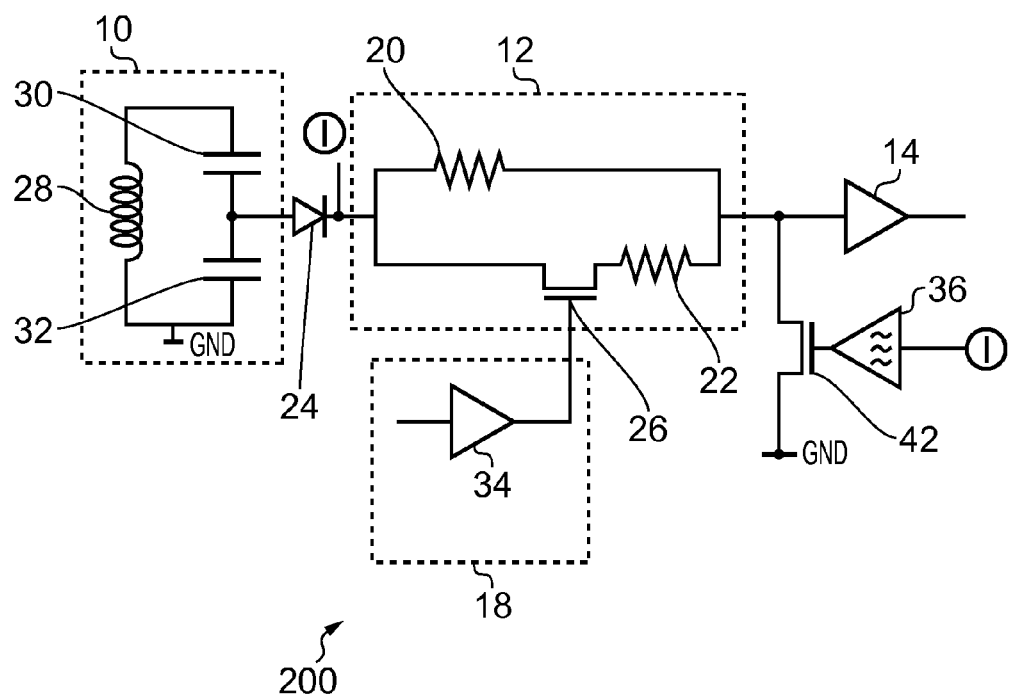
FIG. 2 illustrates an NFC device according to a further embodiment of the invention.

FIG. 2 shows a further embodiment of NFC device 200. Antenna 10 includes a first capacitor 30 arrange in series with a second capacitor 32. A coil or inductor 28 is connected in parallel with first capacitor 30 and second capacitor 32. A first node of a rectifier 24 is connected to the first capacitor 30 and second capacitor 32. A second node of rectifier 24 is connected to a first node of variable resistance element 12 and an input of filter 36. Variable resistance element 12 includes a first resistive path 20 having a resistance RH. Variable resistance element 12 includes a second resistive path having a series connection of NMOS field effect transistor 26 and resistance RL. Control input of FET 26 is connected to controller 18. Controller 18 includes a logic gate 34. An output of logic gate 34 is connected to the gate of NMOS transistor 26. Shunt transistor 42 is connected between an input of amplifier 14 and ground. Shunt transistor 42 may be implemented as an NMOS transistor. Gate of shunt transistor 42 may be connected to an output of filter 36.

In use when the output of logic gate 34 is logic low, the transistor 26 is off and the value of the variable resistance element 12 is determined by the value of the first resistance path RH. When the output of logic gate 34 is high, if the logic gate driving the gate of the NMOS transistor 26 has an output high value of Vgate, and the NMOS transistor 26 has a threshold voltage Vt, then for a value of input voltage less than Vgate−Vt, the value of variable resistance element 12 is equal to the parallel resistance combination, that is to say RH in parallel with RL. For input voltages greater than Vgate−Vt, the NMOS transistor 26 becomes a constant current sink of (Vgate−Vt)/RL, and the value of resistance is close to RH because the output resistance of the transistor as a current sink is much larger than RH. The change in resistance of the variable resistance element 12 with changing input voltage can occur without changing the output of logic gate 34.

The shunt transistor 42 turns on harder with increasing input voltage. This can pull the input of amplifier 14 closer to ground so that most of the input voltage appears across variable resistance element 12. Hence the shunt transistor 42 acts as a variable shunt resistance.

In other embodiments, gate of shunt transistor may be coupled to the antenna via at least one gain circuit tuned to the carrier frequency of the signal received by the antenna.

Figure 3:
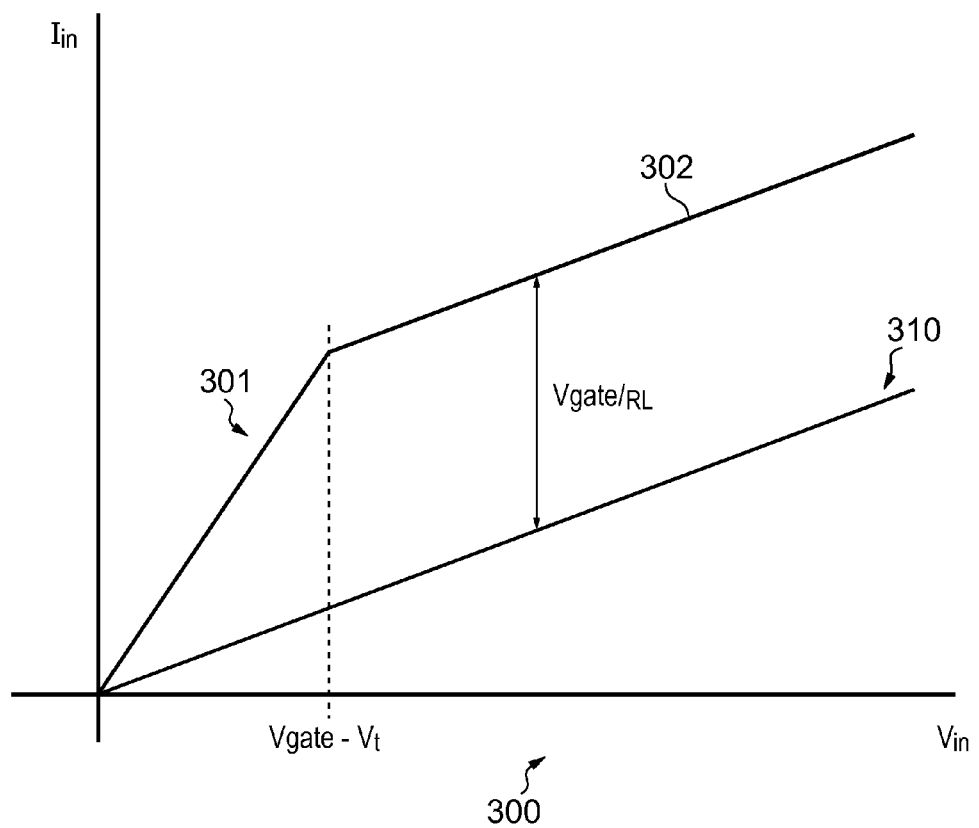
FIG. 3 shows a graph of the change in resistance with input voltage according to the embodiment of FIG. 2.

FIG. 3 shows a graph 300 of the change of current versus input voltage through the NMOS FET transistor 26 of FIG. 2. The Y axis shows the variation of current and the X-axis shows the variation of input voltage. As the input voltage increases (shown in section 301) up to a value of Vgate−Vt, the current increases linearly; the slope of the gradient is equal to (RH+RL)/(RH*RL). When the input voltage increases above Vgate−Vt (shown in section 302) the NMOS transistor 26 operates in the saturation region and so acts as a constant current sink. The current continues to increase but because the output resistance of nmos transistor 26 is high in the saturation region, the slope of the change of voltage against current is now 1/RH. For reference, graph 300 also shows curve 310 which is a straight line of slope 1/RH through the origin. Section 302 is parallel to 310. In further embodiments, RL can be in the range of 3 kOhm to 5 kOhm, and RH can be in the range of 150 kOhm to 250 kOhm.

Figure 4:
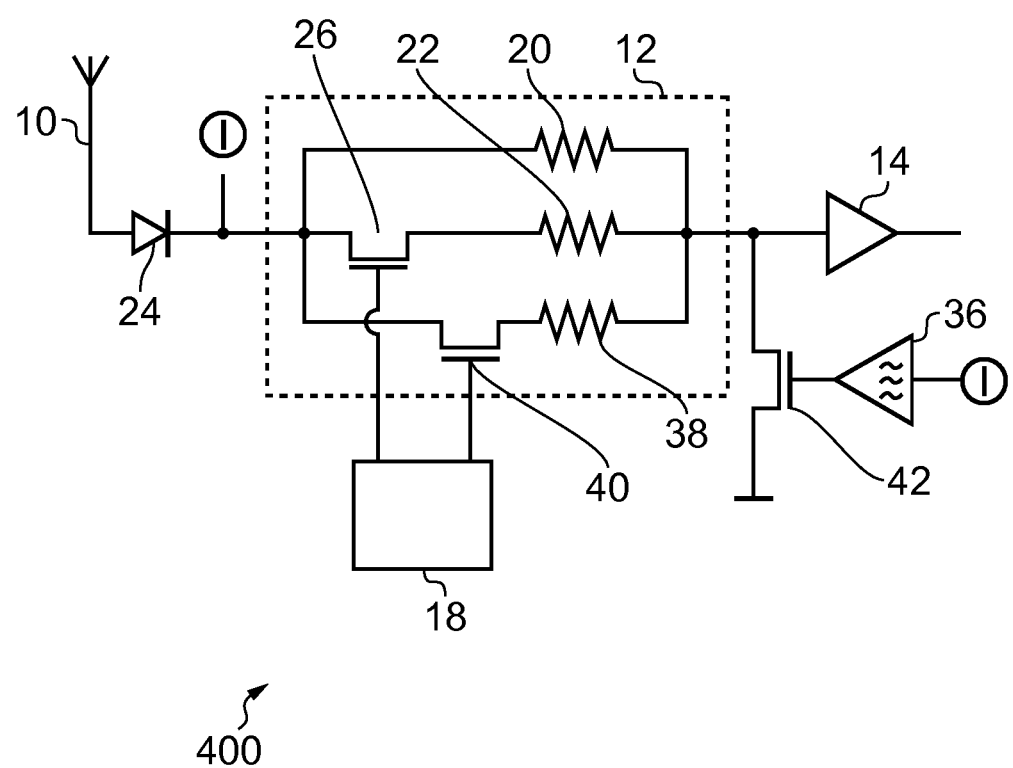
FIG. 4 illustrates an NFC device according to a further embodiment of the invention.

FIG. 4 shows a further embodiment of NFC device 400. Antenna 10 is connected to a first node of a rectifier 24 is connected to the first antenna 10. A second node of rectifier 24 is connected to a first node of variable resistance element 12 and an input of filter 36. Variable resistance element 12 includes a first resistive path 20 having a resistance RH. Variable resistance element 12 includes a second resistive path 22 having a series connection to NMOS field effect transistor 26 and a resistance RL. Variable resistance element 12 includes a third resistive path having a series connection with further NMOS field effect transistor 40 having a resistance of RL2. A first output of controller 18 is connected to the gate of NMOS transistor 26. A second output of controller 18 is connected to the gate of further NMOS transistor 40. Shunt transistor 42 is connected between an input of amplifier 14 and ground. Shunt transistor 42 may be implemented as an NMOS transistor. Gate of shunt transistor 42 may be connected to an output of filter 16.

In use when the first output of controller 18 is logic low, the transistor 26 is off and the value of the variable resistance element 12 is determined by the value of the first resistance path RH. When the first output of controller 18 is logic high, the gate of the NMOS transistor 26 has a voltage value of Vgate, and the NMOS transistor 26 has a threshold voltage Vt. For a value of input voltage less than Vgate−Vt, the value of variable resistance element 12 is equal to the parallel resistance combination, that is to say RH in parallel with RL. For input voltages greater than Vgate−Vt , the NMOS transistor 26 becomes a constant current sink of (Vgate−Vt)/RL, and the value of resistance is close to RH because the output resistance of the transistor as a current sink is much larger than RH. The change in resistance of the variable resistance element 12 with changing input voltage can occur without changing the value of the voltage Vgate.

Similarly when the second output of control 18 is logic high the gate of the NMOS transistor 26 has a voltage value of Vgate, and the further NMOS transistor 40 has a threshold voltage Vt. For a value of input voltage less than Vgate−Vt, the value of variable resistance element 12 is equal to the parallel resistance combination, that is to say RH in parallel with RL2.

If logic high is applied by the controller to both NMOS transistor 26 and further NMOS transistor 40, the voltage at gate of the NMOS transistor 26 and further NMOS transistor 40 is a value Vgate. For a value of input voltage less than Vgate−Vt, the value of variable resistance element 12 is equal to the parallel resistance combination, that is to say RH, RL and RL2 in parallel. For input voltages greater than Vgate−Vt, the NMOS transistor 26 becomes a constant current sink of (Vgate−Vt)/RL, the NMOS transistor 26 becomes a constant current sink of (Vgate−Vt)/RL2 and the value of resistance is close to RH because the output resistance of the transistor as a current sink is much larger than RH. The change in resistance of the variable resistance element 12 with changing input voltage can occur without changing the value of the voltage Vgate.

The shunt transistor 42 turns on harder with increasing input voltage. This can pull the input of amplifier 14 closer to ground so that most of the input voltage appears across variable resistance element 12. Shunt transistor 42 therefore acts as a variable shunt resistance.

In further embodiments, RL may be in the range of 3 kOhm to 5 kOhm, RL2 may be in the range of 50 and 75 kOhm, and RH can be in the range of 150 kOhm to 250 KOhm In other embodiments the variable resistance element can have two resistors in series and a transistor in parallel with one of the resistors and controllable to bypass the resistor. Further embodiments can replace the controller with a fixed voltage coupled to the gates of NMOS transistor 26 and/or NMOS transistor 40.

Herein is described a near field communication device 100 having an antenna 10 which can be adapted to receive signal from a further NFC device. When a signal is received by the antenna, an input voltage is generated. A variable resistance element 12 is connected in series between the antenna 10 and an amplifier 14, which is adapted to increase the input resistance with increasing input voltage. By increasing the resistance when the input voltage is increased the overall power consumption of the device is reduced while maintaining reliable performance, because the higher input signal level is less susceptible to corruption by the noise generated by the variable resistance element 12, and the amplifier 14.

From reading the present disclosure, other variations and modifications will be apparent to the skilled person. Such variations and modifications may involve equivalent and other features which are already known in the art of NFC devices and which may be used instead of, or in addition to, features already described herein.

Although the appended claims are directed to particular combinations of features, it should be understood that the scope of the disclosure of the present invention also includes any novel feature or any novel combination of features disclosed herein either explicitly or implicitly or any generalisation thereof, whether or not it relates to the same invention as presently claimed in any claim and whether or not it mitigates any or all of the same technical problems as does the present invention.

Features which are described in the context of separate embodiments may also be provided in combination in a single embodiment. Conversely, various features which are, for brevity, described in the context of a single embodiment, may also be provided separately or in any suitable sub combination.

The applicant hereby gives notice that new claims may be formulated to such features and/or combinations of such features during the prosecution of the present application or of any further application derived therefrom.

For the sake of completeness it is also stated that the term "comprising" does not exclude other elements or steps, the term "a" or "an" does not exclude a plurality, a single processor or other unit may fulfil the functions of several means recited in the claims and reference signs in the claims shall not be construed as limiting the scope of the claims.

The invention claimed is:

1. A near field communication device comprising:
an antenna configured to receive a signal transmitted by another near field communication device and to generate an input voltage from the signal,
an amplifier,
a variable resistance element arranged in series between the antenna and an input of the amplifier, and
a controller coupled to the variable resistance element; wherein
the near field communication device is operable:
in response to an increase in the input voltage to increase the resistance of the variable resistance element, and
in response to a decrease in the input voltage to decrease the resistance of the variable resistance element.

2. A near field communication device according to claim 1 further comprising
a variable shunt resistance coupled between the input of the amplifier and a ground; wherein
the variable shunt resistance is configured to receive the input voltage from the antenna and to shunt current to the ground, and wherein
the near field communication device is further operable:
in response to an increase in the input voltage to decrease the resistance of the variable shunt resistance, and
in response to a decrease in the input voltage to increase the resistance of the variable shunt resistance.

3. A near field communication device of claim 1, wherein the variable resistance element comprises:
a first path comprising a first resistor, and
a second path comprising a series arrangement of a switch and a second resistor; wherein
the switch is operable to couple the second path in parallel with the first path dependent on the value of the input voltage.

4. A near field communication device according to claim 3, wherein the switch comprises a field effect transistor and the controller is coupled to a gate of the field effect transistor.

5. A near field communication device according to claim wherein the switch is an NMOS transistor having a threshold voltage, the controller is configured to generate a gate control voltage, and wherein
the NMOS transistor is configured to couple the second path in parallel with the first path when the input voltage is less than or equal to the value of the sum of the gate control voltage and the threshold voltage of the NMOS transistor.

6. A near field communication device according to claims 3 comprising a further path comprising a series arrangement of a further switch and a further resistor; wherein
the further switch is operable to couple the further path in parallel with the first path dependent on the value of the input voltage and the control input.

7. A near field communication device according to claims 3, wherein the further switch comprises an NMOS transistor having a gate coupled to a further output of the controller comprises a digital logic gate having an output coupled to the variable resistance element.

8. A near field communication device according to claim 1, wherein the variable shunt resistance comprises a shunt transistor having a control terminal coupled to the antenna.

9. A near field communication device according to claim 8, wherein the shunt transistor is a field effect transistor.

10. A near field communication device according to claim 9, wherein the shunt transistor is an NMOS field effect transistor.

11. A near field communication device according to claim 1, wherein the antenna comprises a coil.

12. A keyless entry device comprising the near field communication device of claim 1.

13. A transponder comprising the near field communication device of claim 1.

14. A RFID tag comprising the near field communication device of claim 1.

15. A hearing aid comprising the near field communication device of claim 1.

* * * * *